United States Patent
Lundquist et al.

(10) Patent No.: US 10,244,019 B2
(45) Date of Patent: *Mar. 26, 2019

(54) METHOD AND DEVICES FOR NEGOTIATING BANDWIDTH IN A PEER-TO-PEER NETWORK

(71) Applicant: AXIS AB, Lund (SE)

(72) Inventors: Johan Lundquist, Lund (SE); Jon Eibertzon, Malmö (SE); Johan Gunnarsson, Lund (SE)

(73) Assignee: AXIS AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/718,896

(22) Filed: Sep. 28, 2017

(65) Prior Publication Data

US 2018/0034872 A1    Feb. 1, 2018

Related U.S. Application Data

(63) Continuation of application No. 15/015,345, filed on Feb. 4, 2016, now Pat. No. 9,813,469.

(30) Foreign Application Priority Data

Mar. 27, 2015  (EP) .................................. 15161399

(51) Int. Cl.
| | | |
|---|---|---|
| *G06F 15/16* | (2006.01) | |
| *H04L 29/06* | (2006.01) | |
| *H04L 12/24* | (2006.01) | |
| *H04N 7/18* | (2006.01) | |
| *H04W 28/20* | (2009.01) | |

(52) U.S. Cl.
CPC ...... *H04L 65/4076* (2013.01); *H04L 41/0896* (2013.01); *H04N 7/181* (2013.01); *H04W 28/20* (2013.01)

(58) Field of Classification Search
CPC .... A61K 31/437; A61K 45/06; C07D 471/04; H04L 41/0896; H04L 65/4076; H04N 7/181; H04W 28/20
USPC ................................................. 709/226, 231
See application file for complete search history.

(56) References Cited

U.S. PATENT DOCUMENTS

| | | | | |
|---|---|---|---|---|
| 7,720,098 | B1* | 5/2010 | Allen | ............... H04W 28/20 370/464 |
| 2002/0067254 | A1 | 6/2002 | Ebata et al. | |
| 2003/0152034 | A1* | 8/2003 | Zhang | ............. H04L 29/12509 370/252 |
| 2003/0191828 | A1* | 10/2003 | Ramanathan | ..... G06F 17/30209 709/221 |
| 2005/0120133 | A1* | 6/2005 | Slack-Smith | ....... G06F 12/0862 709/234 |

(Continued)

OTHER PUBLICATIONS

Korshunov, Pavel et al. "Critical Video Quality for Distributed Automated Video Surveillance", MM'05, Nov. 6-12, 2005, Singapore, 10 pages.

(Continued)

*Primary Examiner* — Phuoc H Nguyen
(74) *Attorney, Agent, or Firm* — Volpe and Koenig, P.C.

(57) ABSTRACT

Method for distributing bandwidth between a plurality of devices in a system having bandwidth limitations, and in particular to a method for negotiating bandwidth in such a system wherein the plurality of devices are interconnected in a peer-to-peer network.

18 Claims, 4 Drawing Sheets

(56) References Cited

U.S. PATENT DOCUMENTS

| | | |
|---|---|---|
| 2005/0125563 A1 | 6/2005 | Douglas |
| 2005/0162268 A1 | 7/2005 | Grindstaff et al. |
| 2009/0113053 A1* | 4/2009 | Van Wie ............ H04L 12/1827 709/226 |
| 2010/0058396 A1 | 3/2010 | Russell et al. |
| 2010/0131325 A1 | 5/2010 | Song et al. |
| 2011/0131278 A1* | 6/2011 | Nieh .................... H04L 67/104 709/204 |
| 2011/0252144 A1* | 10/2011 | Tung .................. H04L 41/0663 709/227 |
| 2012/0218416 A1 | 8/2012 | Leny et al. |
| 2012/0246301 A1* | 9/2012 | Vyrros ................ H04L 45/745 709/224 |
| 2012/0297405 A1* | 11/2012 | Zhang ................... H04H 20/08 725/9 |
| 2014/0222889 A1 | 8/2014 | Bello et al. |
| 2016/0234303 A1* | 8/2016 | Liu ...................... H04L 67/104 |

OTHER PUBLICATIONS

Shin, Junsuk et al. "ASAP: A Camera Sensor Network for Situation Awareness*", OPODIS 2007, LNCS 4878, pp. 31-47 (2007).

Wu, Chien-Ting et al. "Extended DQRAP (XDQRAP) A Cable TV Protocol Functioning as a Distributed Switch", Community Networking Integrated Multimedia Services to the Home, Proceedings of the 1st International Workshop, San Francisco, CA, Jun. 13-14, 1994 (XP_10124391A), pp. 191-198.

"Phoneline networking transceivers—Enhanced physical, media access, and link layer specifications; G.9954 (Jan. 2007)", ITU-T Standard, International Telecommunication Union, Geneva, Switzerland; (XP_017466058), pp. 1-276 (Jan. 9, 2007).

\* cited by examiner

METHOD AND DEVICES FOR NEGOTIATING BANDWIDTH IN A PEER-TO-PEER NETWORK

CROSS REFERENCE TO RELATED APPLICATION

This application is a continuation of U.S. patent application Ser. No. 15/015,345, filed Feb. 4, 2016, which claims priority to European Patent Application No. 15161399.9 filed on Mar. 27, 2015, which are incorporated by reference as if fully set forth.

FIELD OF INVENTION

The present invention relates to distributing bandwidth between a plurality of devices in a system having bandwidth limitations, and in particular to a method for negotiating bandwidth in such a system wherein the plurality of devices are interconnected in a peer-to-peer network. The present invention further relates to such devices and to a computer program product implementing the above method.

BACKGROUND

It is common to have a plurality of devices, each requiring bandwidth, in a system having bandwidth limitations. An example of such system is a surveillance system comprising 10 monitoring devices. The total bandwidth available in the surveillance system may for example be 100 Mbit/s. In such systems, it is known to manually set an upper bandwidth limit for each monitoring device so that a total upper bandwidth limit of the monitoring device does not exceed the 100 Mbit/s limitation, for example by assigning each monitoring device with an upper bandwidth limit of 10 Mbit/s. In this case, each monitoring device will typically have its own bitrate controller which may be set to regulate the encoding of monitoring data acquired by the monitoring device to be transmitted to not exceed the assigned 10 Mbit/s limit. The bitrate of the monitoring data may be lowered by either encoding the monitoring data using a higher compression ratio, or by discarding bits of the monitoring data (e.g. skip frames in an image stream). When the bitrate of the monitoring data is lowered, a reduction in bitrate for the monitoring data, compared to the bitrate that would be required to transmit the originally acquired monitoring data, is increased. However, depending on the monitoring data acquired by the monitoring device, it may be advantageous to adapt the upper bandwidth limit such that the bitrate reduction of the encoded monitoring data may be lower or higher. This requires that the upper bandwidth limits of the monitoring devices can be adjusted.

US 2012/0218416 (Thales) relates to a dynamically reconfigurable video surveillance system which includes at least one video camera, a remote server, at least one viewing terminal. The video camera or cameras include means for compressing the video sequences captured, and the compression ratio is dynamically adaptable by taking into account a control messages originating from the remote server. The control message may include a priority level associated by the remote server with each video streams received originating from the camera or cameras of the system. The priority level is determined by the remote server as a function of the signalling information representative of the activity detected and forwarded by the video camera or cameras to the remote server, or determined by each of the video cameras. Such a system 100 is schematically described in FIG. 1, wherein the remote server 102 may send control messages to any of the video cameras 104a-d for adapting the compression ratio to be used by the video cameras 104a-d. The control message may be dependent on priority levels computed by the video cameras and dependent on activity detected by each of the cameras. These priority levels are transmitted by the video cameras 104a-d to the remote server 102.

However, the video surveillance system in US 2012/0218416 is complex and do not consider the case where all or many of the video cameras has a high priority level.

SUMMARY

In view of the above, an objective of the invention is to solve or at least reduce one or several of the drawbacks discussed above. Generally, the above objective is achieved by the attached independent patent claims.

According to a first aspect, the present invention is realized by a method for negotiating bandwidth in a system comprising a plurality of devices interconnected in a peer-to-peer network, wherein each of the plurality of devices having an adaptable upper bandwidth limit. The method comprising the steps of: calculating, at a requesting device among the plurality of devices, a ranking score of the requesting device indicating a level of priority of increasing the upper bandwidth limit of the requesting device, sending, from the requesting device, a request for additional bandwidth to one or more remaining devices of the plurality of devices, and receiving, at the requesting device, one or more answers from the one or more remaining devices.

Each of the one or more answers corresponds to a respective one of the one or more remaining devices and comprises a ranking score of the remaining device describing a level of priority of keeping the upper bandwidth limit of the remaining device.

The method further comprises determining, at the requesting device, a device, among the one or more remaining devices to which the one or more received answers corresponds, to receive bandwidth from based on the ranking score of the requesting device, and the ranking score of the one or more answers.

The method further comprises increasing the upper bandwidth limit of the requesting device, decreasing the upper bandwidth limit of the determined device to receive bandwidth from.

By the term "bandwidth" should, in the context of present specification, be understood as a capacity for transmitting and/or receiving data at a device. In other words, bandwidth denotes the available bitrate capacity, wherein the bitrate may be defined as data amount transferred/received per time unit. The "upper bandwidth limit" for a device thus describes the maximum capacity for such transmitting and/or receiving data at the device. It should be noted that a total capacity, or bandwidth limitations, for the entire system may not only be limited by the actual network capability of the system but may also be limited by, for example, a storage solution of the system.

By the term "peer-to-peer network" should, in the context of present specification, be understood a decentralized network in which the interconnected devices are able to send and receive messages amongst each other without the use of a centralized administrative system or server.

An advantage of the present invention is that the upper bandwidth limit of individual devices is dynamically negotiated. By dynamically determining the upper bandwidth limit of individual devices, a total bandwidth budget of the system may be used more wisely without exceeding the actual bandwidth limitation of the whole system.

By interconnecting the devices of the system in a peer-to-peer network, the need of a server of taking care of the bandwidth negotiation is removed. A more cost effective system may thus be achieved.

An advantage of determining which device among the devices of the system that bandwidth should be received from based on the ranking score of the requesting device and the ranking score of the one or more answers is that a well substantiated decision may be made. For example, the determined device may be a device which has a lower ranking score compared to the ranking score of the requesting device. According to some embodiments, the determined device may be a device which has a lowest ranking score among the devices that answers were received from. According to some embodiments, if all of the received answers comprise ranking scores which are higher than the ranking score of the requesting device, no device to receive bandwidth from is determined and the upper bandwidth of the requesting device will thus not be increased.

By increasing the upper bandwidth limit of the requesting device, and at the same time decreasing the upper bandwidth limit of the determined device to receive bandwidth from, the risk of exceeding the actual bandwidth limitation of the system is reduced. Advantageously, the upper bandwidth limit of the requesting device is increased with the same amount as the upper bandwidth limit of the determined device to receive bandwidth from is decreased with.

According to some embodiments, the request for additional bandwidth is a broadcast message in the peer-to-peer network. Consequently, the requesting device does not need to keep track of how many devices that are connected to the system via the peer-to-peer network and identifiers (IP-address or similar) of these devices.

According to some embodiments, the request for additional bandwidth comprises an identifier of the requesting device, and wherein each of the one or more answers is a unicast message in the peer-to-peer network. Consequently, the data traffic and the computational load in the peer-to-peer network is reduces compared to if each answer is a broadcast message.

According to some embodiments, the step of increasing the upper bandwidth limit of the requesting device comprises increasing the upper bandwidth limit with a predetermined amount, and the step of decreasing the upper bandwidth limit of the determined device comprises decreasing the upper bandwidth limit with the predetermined amount. According to this embodiment, the redistribution of bandwidth will be performed in iterative steps, which may be advantageous in that the redistribution may be more fine-grained. If, after the upper bandwidth limit of the requesting device has been increased by the predetermined amount, further increase is requested by the requesting device, the outcome of such request may be different compared to the first request since the ranking scores of the requesting device and the devices answering to the request may have changed. Consequently, if the requesting device the first time receives bandwidth from a first one of the remaining devices and subsequently sends out a further request, bandwidth may this time be received from a different one of the remaining devices or not at all. Moreover, a further advantage of this embodiment may be that the computational complexity at the requesting device is reduced since no calculation of the amount to increase/decrease the upper bandwidth limit with of the concerned devices is needed.

According to some embodiments, the method further comprises the steps of: calculating a difference between the ranking score of the requesting device and the ranking score of the answer corresponding to the determined device to receive bandwidth from, and, based on the calculated difference, calculating an amount of bandwidth to be received by the requesting device from the determined device, wherein the step of increasing the upper bandwidth limit of the requesting device comprises increasing the upper bandwidth limit with the calculated amount of bandwidth, and wherein the step of decreasing the upper bandwidth limit of the determined device comprises decreasing the upper bandwidth limit with the calculated amount of bandwidth. An advantage of this embodiment may be that more bandwidth can be received from a device with a much lower ranking score compared to from a device with almost the same ranking score. This may further improve the efficiency and accuracy of the bandwidth negotiation method.

According to some embodiments, each of the one or more answers further comprises a value indicating a surplus bandwidth at the remaining device to which the answer corresponds, and wherein the step of determining, at the requesting device, a device, among the one or more remaining devices to which the one or more received answers corresponds, to receive bandwidth from is further based on the value indicating a surplus bandwidth of the one or more answers. An advantage of this embodiment is that unused bandwidth can be received from a device even if the device has a higher ranking score compared to other devices from which answers are received. In other words, a device having a low ranking score but is utilizing all bandwidth which is designated to it via the upper bandwidth limit (i.e. having no surplus bandwidth designated) may not be determined as the device to receive bandwidth from if another device exists that have an upper bandwidth limit which is higher than what is actually utilized by the device (i.e. having a surplus bandwidth designated) for transmitting and/or receiving data. In this case, bandwidth can even be received from a device having a higher ranking score compared to the ranking score of the requesting device.

According to other embodiments, the answers do not indicate a surplus bandwidth but instead the ranking score of a remaining device is calculated at least partly based on such surplus bandwidth. Further alternatives on what ground(s) the ranking score of a remaining device is calculated will now be described.

According to some embodiments, the ranking score of a remaining device is calculated using at least one of:
  a value indicating a surplus bandwidth of the remaining device,
  the upper bandwidth limit of the remaining device,
  an importance parameter of the remaining device in the system comprising the plurality of devices,
  a time scheduling parameter
  a history parameter relating to previous ranking scores of the remaining device.

The importance parameter may be a parameter reflecting manual inputs from a user, e.g. indicating that the specific device is important and thus should always have a high upper bandwidth limit compared to the upper bandwidth limits of the other devices in the system.

The scheduling parameter could be used if a specific device is more or less important compared to other devices in the system during specific times of the day, during weekends etc. Other possible parameters or values used for determining the ranking score of a remaining device will be described below.

According to some embodiments, the ranking score of the requesting device is calculated using at least one of:
- a parameter indicating an amount of missing bandwidth at the requesting device,
- the upper bandwidth limit of the requesting device,
- an importance parameter of the requesting device in the system comprising the plurality of devices,
- a time scheduling parameter
- a history parameter relating to previous ranking scores of the requesting device.

The amount of missing bandwidth may be calculated by comparing the upper bandwidth limit of the requesting device with what bandwidth that would be needed for transmitting and/or receiving data from/to the requesting device if all data could be transmitted and/or received. For example, if the requesting device is a monitoring device acquiring a video stream to be transmitted from the requesting device, a present upper bandwidth limit may require a higher bitrate reduction of the encoded video stream than what would be beneficial for transmitting the video stream without visible compression artefacts or similar. In this case, the requesting device may calculate a desired upper bandwidth limit and the difference between the desired upper bandwidth limit and the present upper bandwidth limit. According to some embodiments such an amount of missing bandwidth is used for calculating the amount of bandwidth which the upper bandwidth limit of the requesting device is increased width.

The importance parameter may be a parameter reflecting manual inputs from a user, e.g. indicating that requesting device is important and thus should always have a high upper bandwidth limit compared to the upper bandwidth limits of the other devices in the system.

The scheduling parameter could be used if the specific device is more or less important compared to other devices in the system during specific times of the day, during weekends etc. Other possible parameters or values used for determining the ranking score of the requesting device will be described below.

According to some embodiments, the plurality of devices are monitoring devices each acquiring a respective monitoring data, wherein the ranking score of the requesting device and/or the ranking score of a remaining device is calculated using at least one of:
- an event parameter describing events in a content of the monitoring data,
- a complexity parameter describing the complexity of the content of the monitoring data.

The monitoring data may be a video stream or an audio stream. In such a system comprising monitoring devices each transmitting monitoring data, the bitrate of the transmitted data from a monitoring may be controlled to meet the upper bandwidth limit of the monitoring device by encoding the monitoring data using different compression ratios and/or discard bits of the monitoring data when encoding the monitoring data such that the bit rate that is required for transmitting the encoded data is controlled and the required bitrate reduction is achieved. However, if the monitoring data comprises a lot of events that is considered important (for example a lot of people in a video stream), a lower bitrate reduction may be desirable. Similarly, if the content of the monitoring data is complex, a higher bitrate reduction may be needed for meeting the upper bandwidth limit, which may be undesirable since a lot of data thus may be lost in the encoding.

According to some embodiments, each of the plurality of devices has a lower bandwidth limit. In this case bandwidth may not be received from a device when this would result in that the upper bandwidth limit of the device will be lower than the lower bandwidth limit. This may be achieved in different ways, e.g. by increasing the ranking score of such a device, or by including the lower bandwidth limit in the reply to the request from the requesting device and taking this limit into account when determining the device to receive bandwidth from. A further option may be that a remaining device having an upper available bandwidth near or even (for some reason) below the lower bandwidth limit is not replying to the request from the requesting device.

According to some embodiments, when a new device is added to the system comprising the plurality of devices, the upper bandwidth limit of the new device is zero. This could result in that this new device start to send out requests for bandwidth, which will result in that the available bandwidth for the system is redistributed among the plurality of devices including the new device without risking that the combined upper bandwidth limits of the devices in the system exceeds the bandwidth limitation of the system.

In a second aspect, the present invention provides a computer program product comprising a computer-readable storage medium with instructions adapted to carry out the method of the first aspect when executed by a device having processing capability.

In a third aspect, the present invention provides a device interconnected with one or more other devices in a peer-to-peer network, the device having an adaptable upper bandwidth limit, the device being adapted to: calculate a ranking score indicating a level of priority of increasing the upper bandwidth limit, send a request for additional bandwidth to the one or more other devices, and receive one or more answers from the one or more other devices.

Each of the one or more answers corresponds to a respective one of the one or more other devices and comprises a ranking score of the other device describing a level of priority of keeping the upper bandwidth limit of the other device.

The device is further adapted to determine a device, among the one or more other devices to which the one or more received answers corresponds, to receive bandwidth from based on the ranking score and the ranking score of the one or more answers.

The device is further adapted to increase the upper bandwidth limit, and send a message to the determined device instructing the determined device to decrease the upper bandwidth limit of the determined device.

In a fourth aspect, the present invention provides a device interconnected with one or more other devices in a peer-to-peer network, the device having an adaptable upper bandwidth limit, the device being adapted to: receive a request for bandwidth from a requesting device among the one or more other devices, calculate a ranking score indicating a level of priority of keeping the upper bandwidth limit, send an answer to the request for additional bandwidth, the answer comprising the ranking score, receive a message with instructions to decrease the upper bandwidth limit of the device, and in response thereto, decrease the upper bandwidth limit.

The device according to the third aspect and/or the fourth aspect may according to some embodiments be a monitoring device acquiring monitoring data.

The second, third and fourth aspect may generally have the same features and advantages as the first aspect.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein:

FIG. 7 further describe such a video camera.

DETAILED DESCRIPTION OF THE PREFERRED EMBODIMENTS

Figure 1:
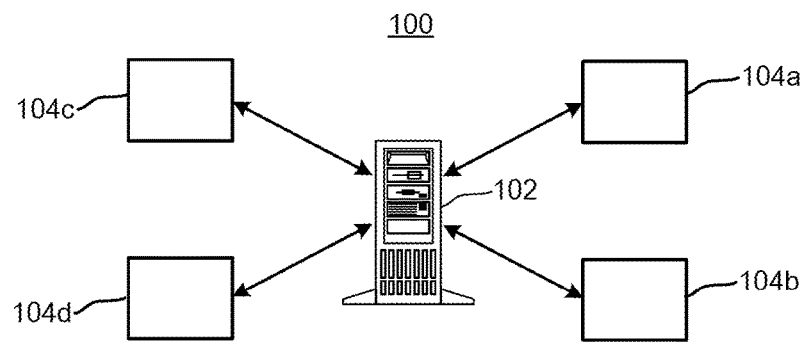
FIG. 1 shows a prior art system wherein a compression ratio of video cameras of the system is dynamically adoptable and determined by a server.
Figure 2:
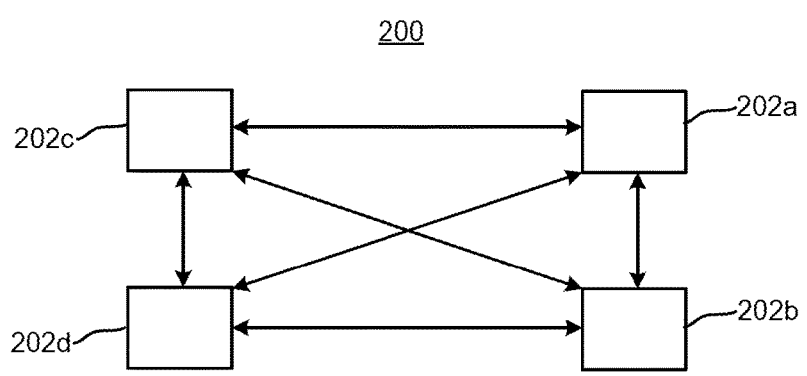
FIG. 2 shows a plurality of devices interconnected in a peer-to-peer network.

FIG. 2 is a schematic example of a system comprising a plurality of devices 202a-d interconnected in a peer-to-peer network 200. Such a network 200 remove the need of a centralized server for sharing resources, e.g. processing power, disk storage or network bandwidth, between the devices 202a-d.

A further advantage of a peer-to-peer network 200 is that the peer-to-peer protocols used may have routines for handling loss of devices (e.g. if a device stop functioning or is otherwise disconnected from the network) and newly joined devices in the peer-to-peer network 200 in a convenient and reliable way. The system will hence be able to continuously adapt to changes to the system.

In the following, a method for negotiating bandwidth in a system comprising a plurality of devices 202a-d interconnected in a peer-to-peer network 200 will be described.

As described above, the devices 202a-d in the system can share network bandwidth. However, the method for negotiating bandwidth described below may be applied to any type of network or system with bandwidth limitations. The bandwidth could for example be limited by a storage solution of the system or the actual network capacity of the system. The network capacity could relate to both downlink capacity and/or uplink capacity. For example, if the system comprises a plurality of mobile phones requesting video streams on a limited bandwidth system, the bandwidth limitation relates to the downlink capacity of the system. If the system on the other hand comprises monitoring devices acquiring monitoring data to be transmitted to a server for storage, the bandwidth limitation relates to the uplink capacity of the system or to the amount of data that the server can store per time unit.

The arrows in FIG. 2 describe that each of the plurality of devices 202a-d can communicate with each other. The arrows in FIG. 2 are representations of the communication possibilities. Other communication routes are possible, for example, if device 202a communicates with device 202d, it could send a message via device 202c or via device 202b instead of directly to device 202d.

Figure 3:
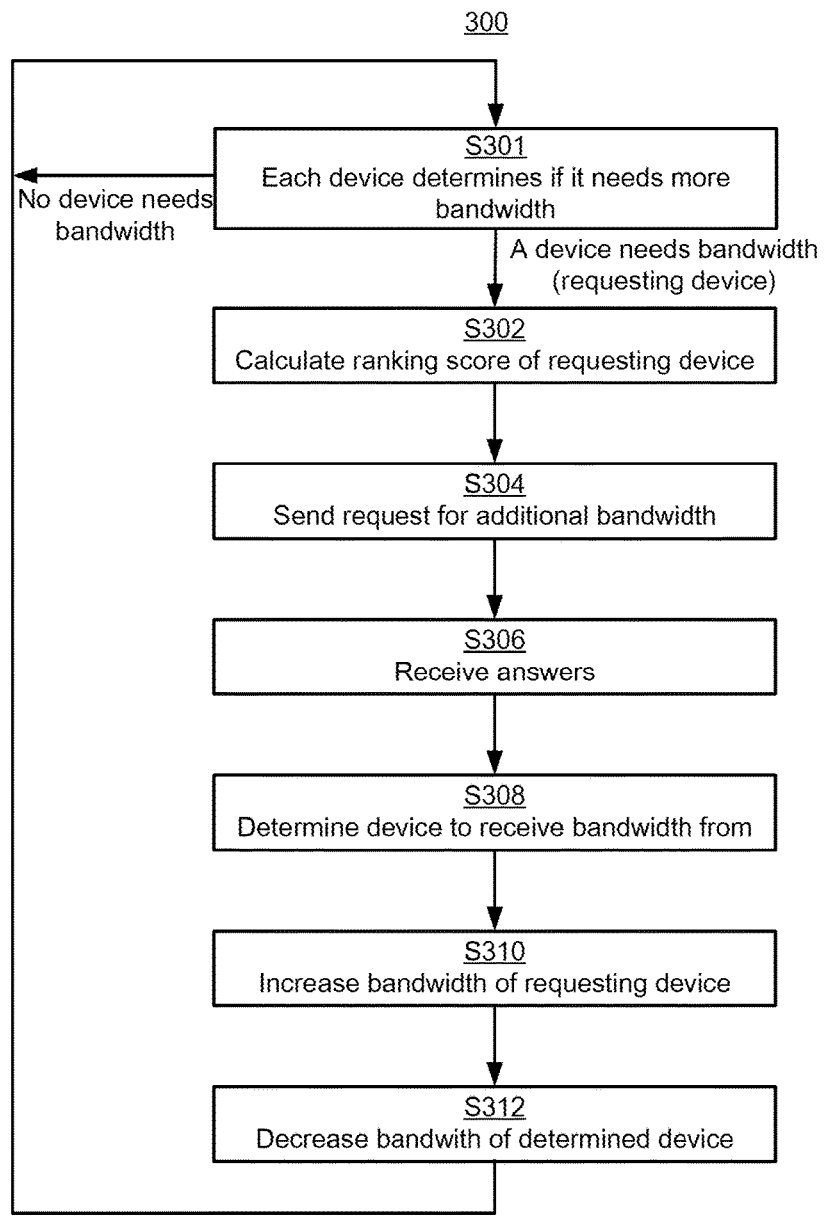
FIG. 3 shows a method for negotiating bandwidth in the peer-to-peer network of FIG. 2.

FIG. 3 shows a method for negotiating bandwidth in the peer-to-peer network 200 of FIG. 2. Each of the devices 202a-d interconnected in the peer-to-peer network has a local bit rate controller which controls the bit rate of the individual device 202a-d. Each of the devices 202a-d further has an adaptable upper bandwidth limit which sets the maximum bit rate of data that the device 202a-d can transmit or receive. When the bit rate of data of a device 202a-d approaches the upper bandwidth limit, the device may send a request for additional bandwidth to one or more remaining devices of the plurality of devices 202a-d. Consequently, the first step of the method of FIG. 3 is to determine S301 if any device 202a-d need more bandwidth, which thus is done individually by each device 202a-d. If a device of the plurality of devices 202a-d interconnected in the peer-to-peer network needs more bandwidth, this device, i.e. a requesting device among the plurality of devices, performs the steps S302-S310 shown in FIG. 3. The requesting device thus calculates S302 a ranking score indicating a level of priority of increasing the upper bandwidth limit of the requesting device. This calculation will be further described in conjunction with FIG. 4 below. The next step in the method 300 is that the requesting device sends S304 a request for additional bandwidth to one or more remaining devices of the plurality of devices. This means that the requesting device sends out requests to e.g. all of the other devices in the peer-to-peer network, or at least to some of the devices. Subsequently, the requesting device receives S306 one or more answers from the one or more remaining devices, wherein each of the one or more answers corresponds to a respective one of the one or more remaining devices. According to some embodiments, an answer is received from each of the remaining devices in the peer-to-peer network, but for different reasons some of the answers may not be received or not sent by a remaining device. For example, transfers of data over a communication network may result in lost or missing data packets which mean that the data packet in which an answer is sent may not be received at the requesting device.

Each of the answers received by the requesting device comprises a ranking score of the remaining device describing a level of priority of keeping the upper bandwidth limit of the remaining device. This ranking score and the calculation thereof will be further described below.

The next step in the method 300 is that the requesting device determines S308 a device to receive bandwidth from. This determination is done based on at least the ranking score of the requesting device and the ranking score of the one or more answers. For example, the requesting device may determine that the device with the lowest ranking score should be the one to receive bandwidth from. According to some embodiments, if all of the answers have ranking scores which are higher than the ranking score of the requesting device, no device to receive bandwidth from will be determined and the upper bandwidth limit of the requesting device will be kept as is.

However, if it is determined, by the requesting device, that bandwidth should be received from one of the remaining devices, the next steps in the method 300 are to increase S310 the upper bandwidth limit of the requesting device which may be done by the local bit rate controller of the requesting device, and to decrease S312 the upper bandwidth limit of the determined device to receive bandwidth from, which may be done by the local bit rate controller of the determined device.

Since the required bandwidth for each of the devices interconnected in the peer-to-peer network may dynamically change, the method 300 may then start over again if it is determined S301 that another device, or the same device that just got an increased upper bandwidth limit, needs more bandwidth.

Figure 4:
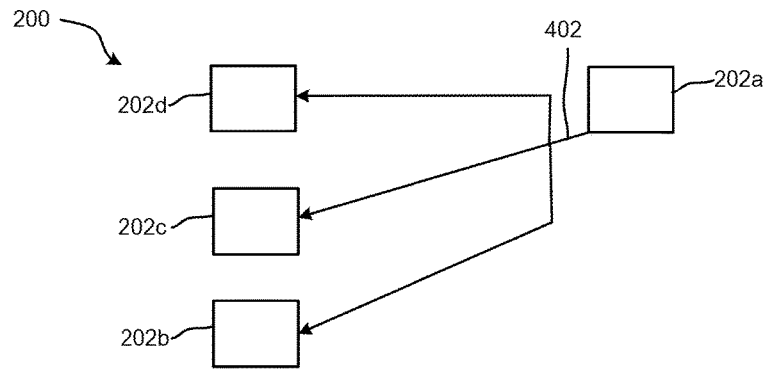
FIG. 4 shows by way of example how a request for bandwidth is transmitted from a requesting device to remaining devices in the peer-to-peer network.

FIG. 4 describe by way of example how a request for bandwidth 402 is transmitted from a requesting device 202a as a broadcast message 402 in the peer-to-peer network 200. Broadcasting refers to transmitting a packet that will be received by every device, e.g. by devices 202b-d, in the network. In contrast to other ways of transmitting message, e.g. unicast or multicast, the addresses of the devices to receive the message is not needed when the message is transmitted as a broadcast message. It should be noted that according to some embodiments, another way of transmitting the request for bandwidth is used, e.g. unicast or multicast, for the request for bandwidth instead of a utilizing a broadcast message.

Figure 5:
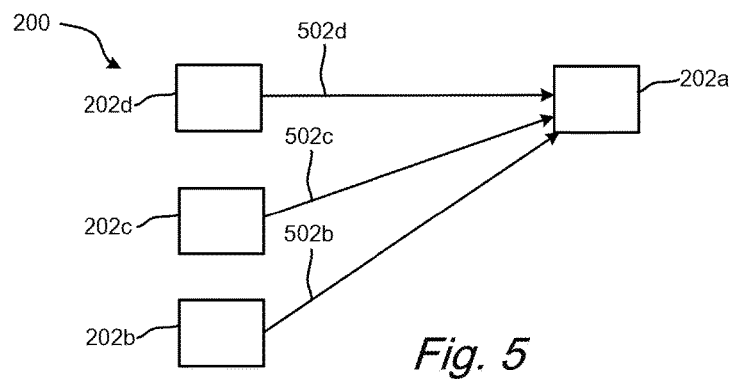
FIG. 5 shows by way of example how answers to the request for bandwidth are transmitted from the remaining devices to the requesting device.

The requesting device 202a thus sends a request for additional bandwidth to the one or more other devices. Each of the remaining devices 202b-d thus receives the request 402 for bandwidth from the requesting device 202a. The request for bandwidth 402 may comprise information about the requesting device 202a. According to some embodiments, the request 402 comprises an identifier of the requesting device 202a. This may be advantageous in that an answer 502b-d to the request 402 from a remaining device 202b-d may be a unicast message in the peer-to-peer network 200. This embodiment is described in FIG. 5 wherein each of the one or more answers 502b-d is a unicast message in the peer-to-peer network. In FIG. 5, each of the one or more answers 502b-d corresponds to a respective one of the one or more remaining devices 202b-d and is addressed directly to the requesting device 202a. According to other embodiments, the answers are also broadcast messages which may be advantageous in that all devices in the peer-to-peer system 200 may be aware of the information in the answers from each of the answering devices 202b-d, e.g. the ranking score of each of the answering devices 202b-d. In FIG. 5, all of the devices 202b-d which received the request 402 (as described in FIG. 4), sends an answer 502a-d to the requesting device. However, according to some embodiments, the request for additional bandwidth 402 comprises the ranking score of the requesting device 402. In this case, the answer to the request for additional bandwidth from a particular remaining device of the one or more remaining devices may only be sent from the particular remaining device if the ranking score of the requesting device is higher than the ranking score of the particular remaining device.

The requesting device is thus adapted to calculate the ranking score indicating a level of priority of increasing the upper bandwidth limit. The ranking score of the requesting device 202a may be calculated based on a variety of different parameters. One such parameter may be the amount of bandwidth which the local bit rate controller determines is lacking for being able to transmit or receive data in an advantageous way. For example if the device is a mobile phone which receives a video stream which has to be received in a very compressed state in order to meet the upper bandwidth limit, the local bit rate controller may determine that an increase of the upper bandwidth limit would be beneficial, and also determine the amount of bandwidth that is lacking.

The ranking score of the requesting device 202a may further be based on the current upper bandwidth limit of the requesting device.

The ranking score of the requesting device 202a may further be based on an importance parameter of the requesting device in the system comprising the plurality of devices. For example if the device is a monitoring device acquiring monitoring data, a device positioned and directed towards an important monitoring location may have a high importance from a monitoring view and thus have a importance parameter reflecting this. This may thus lead to that if a device with an importance parameter with a high value needs more bandwidth, the ranking score may be high. Such an importance parameter may be reflecting manual input from a user, or be automatically calculated.

The ranking score of the requesting device 202a may further be based on a time scheduling parameter, e.g. if the device is considered more or less important in the system of devices during certain times of the day or night, or at certain week days or months etc.

The ranking score of the requesting device 202a may further be based on a history parameter relating to previous ranking scores of the requesting device.

The ranking score of the requesting device 202a may further be based on events, for example if the device is battery driven and a power shortage is expected soon. In this case it may be vital that any data collected by the device or stored at the device is transmitted quickly to some other location for storage. Such a device may e.g. be a network-attached storage (NAS) with an Uninterruptible Power Supply (UPS).

In the case the requesting device 202a is monitoring device acquiring monitoring data, the ranking score may be based on events of the acquired data, e.g. an event parameter describing events in a content of the monitoring data. For example, if the device is a monitoring camera which acquire video showing a person of interest, or showing a crime taking place, or just generally comprising event which may be interesting from a monitoring perspective, this may lead to a higher ranking score.

The ranking score may also be calculated based on a complexity parameter describing the complexity of the content of the monitoring data. Since such complexity may lead to an increased compression ratio and/or more discarded bits when encoding the monitoring data in order to meet the upper bandwidth limit, it may be advantageous to increase the ranking score of the requesting device such that the upper bandwidth limit is more likely to increase.

Each of the remaining devices 202b-d is adapted to calculate the ranking score which indicates a level of priority of keeping the upper bandwidth limit. The ranking score of a remaining device, i.e. devices 202b-d in FIG. 4-6 may be calculated in a similar manner, e.g. based on at least one of:
  a value indicating a surplus bandwidth of the remaining device,
  the upper bandwidth limit of the remaining device,
  an importance parameter of the remaining device in the system comprising the plurality of devices,
  a time scheduling parameter
  a history parameter relating to previous ranking scores of the remaining device.

For example, if a remaining device 202b-d has unused bandwidth, i.e. that the upper bandwidth limit is higher than the bandwidth that is actually needed e.g. for receiving or transmitting data, this may lead to a lower ranking score. The ranking score of a remaining device 202b-d may further be based on events at the device or in data collected by the device as described above in conjunction with the requesting device.

Such indication of surplus bandwidth may further be included in a reply 502*b-d* sent from a remaining device 202*b-d* to the requesting device 202*a*. In other words, each of the one or more answers 502*b-d* may further comprise a value indicating a surplus bandwidth at the remaining device 202*b-d* to which the answer corresponds. Such value(s) may be used at the requesting device 202*a* for determining a device 202*c*, among the one or more remaining devices 202*b-d* to which the one or more received answers 502*b-d* corresponds, to receive bandwidth from. This is described in FIG. 6. If an indication of surplus bandwidth is included in the answers 502*b-d*, the determination may be based on such values. However, the determination of which device to receive bandwidth from is based at least on the ranking score of the requesting device, and the ranking score of the one or more answers. By also including the surplus bandwidth at the remaining devices, bandwidth may be received from a device which has such surplus bandwidth, even if the ranking score of the determined device is not the lowest of the ranking scores among the received answers. According to some embodiments, if more than one answer comprising a value indicating a surplus bandwidth above zero is received, the step of determining, at the requesting device 202*a*, a device to receive available bandwidth from comprises selecting an answer with a lowest ranking score among the more than one answer. The device to receive available bandwidth may then be the device to which the answer with the lowest ranking score corresponds. According to other embodiments, the device with the most surplus bandwidth is chosen as the device to receive bandwidth from.

Figure 6:
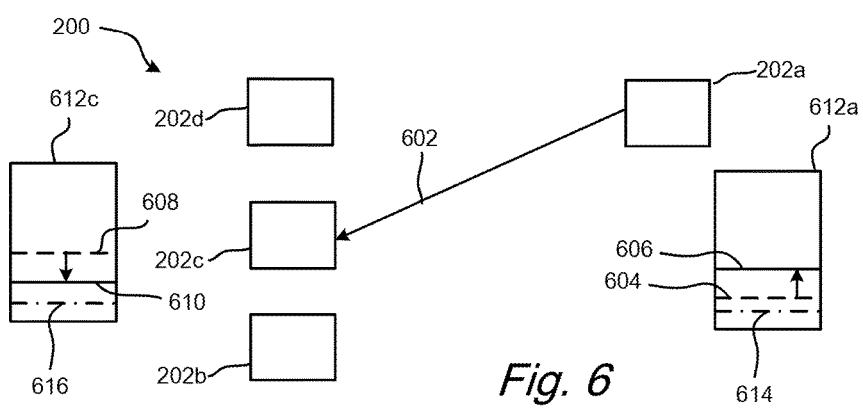
FIG. 6 shows by way of example how an upper bandwidth limit of the requesting device is increased and how an upper bandwidth limit of a determined device is decreased.

In FIG. 6, the device referred to as 202*c* is determined to be the device from which bandwidth should be received. In FIG. 6, the sizes of the boxes 612*a*, 612*c* each represent the total amount of available bandwidth in the system comprising the plurality of devices 202*a-d* interconnected in a peer-to-peer network. In the left box 612*c*, the dotted line 608 represents a current upper bandwidth limit of the device 202*c* determined to be the device from which bandwidth should be received. In the right box 612*a*, the dotted line 604 represents a current upper bandwidth limit of the requesting device 202*a*. The requesting device increases the upper bandwidth limit up to the level indicated by the line 606, and send a message 602 to the determined device 202*c* instructing the determined device 202*c* to decrease the upper bandwidth limit of the determined device. The determined device 202*c* thus receives the message 602 with instructions to decrease the upper bandwidth limit of the device 202*c*, and in response thereto, decreases the upper bandwidth limit down to the level indicated by the line 610.

According to some embodiments, the upper bandwidth limit of the requesting device 202*a* is increased with a predetermined amount, and the upper bandwidth limit of the determined device 202*c* is decreased with the same predetermined amount. This means that the redistribution of bandwidth will typically be done in iterative steps, with a predetermined step in bitrate (bandwidth) for each iteration. The request for bandwidth 402 may hence not indicate how much bandwidth is needed, just that an increase is requested. The predetermined amount may be provided by a user to the system. The predetermined amount may be based on the total available bandwidth in the system (e.g. total available bandwidth divided by 100, 50 or any other suitable number) and/or based on the number of devices interconnected in the peer-to-peer network. By way of example, the predetermined amount may be 0.5 Mbit/sec, 1 Mbit/sec or 3 Mbit/sec.

According to some embodiments, in order to determine the amount of bandwidth by which the upper bandwidth limit at the requesting device will be increased, a difference between the ranking score of the requesting device and the ranking score of the answer corresponding to the determined device to receive bandwidth from may be calculated. Based on this difference, an amount of bandwidth to be received by the requesting device from the determined device can be calculated. This calculation may further be based on the total available bandwidth of the system, e.g. by dividing the total available bandwidth with a suitable value based on the calculated difference. The calculated amount of bandwidth is then used for increasing the upper bandwidth limit of the requesting device 202*a* and further included in the message 602 sent to the determined device 202*c* which subsequently decreases the upper bandwidth limit with this amount. Such redistribution may also be iterative, but the amount of bandwidth to be received may differ between two requests for bandwidth.

Furthermore, each of the plurality of devices may have a lower bandwidth limit, i.e. the dotted dashed lines 614, 616 for devices 202*a*, 202*c* respectively. According to some embodiments, bandwidth cannot be received from a device when this would result in that the upper bandwidth limit of the device will be lower than the lower bandwidth limit. This may be implemented in different ways, for example by not answering the request for additional bandwidth if the current upper bandwidth of a remaining device is near or lower than the lower bandwidth limit, or by increasing the ranking score of the remaining device in this case or by not indicating any surplus bandwidth even if such exists. For the embodiment in FIG. 6, the adjusted upper bandwidth limits 606, 610 are above the lower bandwidth limit 614, 616.

As described above, an advantage of using a peer-to-peer network is that it handles newly joined devices of the peer-to-peer network in a convenient and reliable way. In order to distribute the available bandwidth to a newly joined device, it is advantageous to set the upper bandwidth limit of the new device to zero. The local bit rate controller of the new device may immediately determine that additional bandwidth is required, which in turn leads to that the new device sends out a request for additional bandwidth. The available total bandwidth of the system will be distributed among all of the devices interconnected in the peer-to-peer network, depending on at least their respective ranking scores. If an iterative approach is used as described above, this distribution may be handled in a convenient way wherein more than one of the "old" devices may contribute with bandwidth to the new device.

As mentioned above, the devices interconnected in a peer-to-peer network may be monitoring devices each acquiring a respective monitoring data. Examples of such devices are monitoring cameras for acquiring a video stream or monitoring microphones for acquiring an audio stream.

Figure 7:
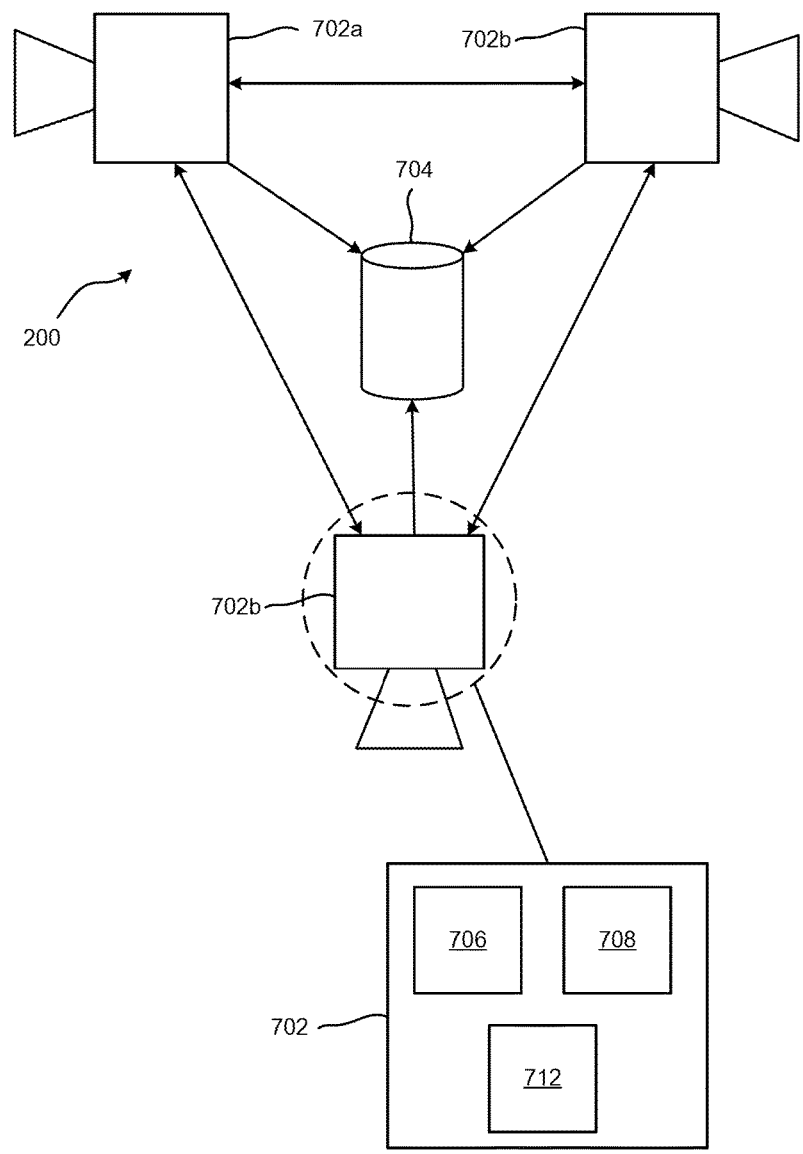
FIG. 7 shows a system comprising video cameras storing their respective video streams in a central storage.

FIG. 7 describe by way of example a system comprising three cameras 702*a-c* interconnected in a peer-to-peer network 200. A camera 702*a-c* could be any type of camera; e.g. capturing visual light, a thermal camera, a time-of-flight camera or any other sensor array, e.g. capturing a depth map. Different types of cameras could be used in the same system.

In FIG. 7, each camera acquires a video stream which is stored in a central storage 704. The storage capacity, the amount of data which the storage 704 can store per time unit, is limited. This means that the each camera 702*a-c* may need to encode the acquired video stream in order to achieve bitrate reduction as described above. As also described above, the bitrate reduction (via the upper bandwidth limit)

may be negotiated between the cameras based at least the ranking score of each camera.

FIG. 7 further comprises by way of example a schematic illustration of a device 702 in the system. This illustration is not specific for a camera, but a more general illustration for any device that can be interconnected with other devices in a peer-to-peer network as described herein. The device 702 comprises a processor 706 which may be used for all calculations when negotiating bandwidth, e.g. for calculating a ranking score and determine a device to receive bandwidth from. The processor 706 is also used for any calculations performed by the local bit rate controller as described above. The device 702 further comprises a digital network module 708 for receiving and/or transmitting data, e.g. to the central storage 704. The device 702 further comprises a module for transmitting and receiving messages within the peer-to-peer network 200.

What is claimed is:

1. A method for negotiating bandwidth in a system comprising a plurality of devices interconnected in a peer-to-peer network, each of the plurality of devices having an adaptable upper bandwidth limit, the method comprising:
    calculating, at a requesting device among the plurality of devices, a ranking score of the requesting device indicating a level of priority of increasing the upper bandwidth limit of the requesting device,
    sending, from the requesting device, a request for additional bandwidth to one or more remaining, peer devices of the plurality of devices, wherein none of the peer devices comprises a server for distributing bandwidth in a centralized manner,
    receiving, at the requesting device, one or more answers from the one or more remaining devices, wherein each of the one or more answers corresponds to a respective one of the one or more remaining devices and comprises:
        a ranking score of the remaining device describing a level of priority of keeping the upper bandwidth limit of the remaining device,
    determining, at the requesting device, a device, among the one or more remaining devices to which the one or more received answers corresponds, to receive bandwidth from based on:
        the ranking score of the requesting device, and
        the ranking score of the one or more answers,
    increasing the upper bandwidth limit of the requesting device, and
    instructing, by the requesting device, the determined device to decrease the upper bandwidth limit of the determined device to receive bandwidth from.

2. The method according to claim 1, wherein the request for additional bandwidth is a broadcast message in the peer-to-peer network.

3. The method according to claim 1, wherein the request for additional bandwidth comprises an identifier of the requesting device, and wherein each of the one or more answers is a unicast message in the peer-to-peer network.

4. The method according to claim 1, wherein the step of increasing the upper bandwidth limit of the requesting device comprises increasing the upper bandwidth limit by a predetermined amount, and wherein the step of decreasing the upper bandwidth limit of the determined device comprises decreasing the upper bandwidth limit by the predetermined amount.

5. The method according to claim 1, further comprising the steps of calculating a difference between the ranking score of the requesting device and the ranking score of the answer corresponding to the determined device to receive bandwidth from, and,
based on the calculated difference, calculating an amount of bandwidth to be received by the requesting device from the determined device,
wherein the step of increasing the upper bandwidth limit of the requesting device comprises increasing the upper bandwidth limit by the calculated amount of bandwidth, and wherein the step of decreasing the upper bandwidth limit of the determined device comprises decreasing the upper bandwidth limit by the calculated amount of bandwidth.

6. The method according to claim 1, wherein each of the one or more answers further comprises a value indicating a surplus bandwidth at the remaining device to which the answer corresponds, and wherein the step of determining, at the requesting device, a device, among the one or more remaining devices to which the one or more received answers corresponds, to receive bandwidth from is further based on: the value indicating a surplus bandwidth of the one or more answers.

7. The method according to claim 1, wherein the ranking score of a remaining device is calculated using at least one of:
    a value indicating a surplus bandwidth of the remaining device,
    the upper bandwidth limit of the remaining device,
    an importance parameter of the remaining device in the system comprising the plurality of devices,
    a time scheduling parameter, and
    a history parameter relating to previous ranking scores of the remaining device.

8. The method according to claim 1, wherein the ranking score of the requesting device is calculated using at least one of:
    a parameter indicating an amount of missing bandwidth at the requesting device,
    the upper bandwidth limit of the requesting device,
    an importance parameter of the requesting device in the system comprising the plurality of devices,
    a time scheduling parameter, and
    a history parameter relating to previous ranking scores of the requesting device.

9. The method according to claim 1, wherein the plurality of devices are monitoring devices each acquiring a respective monitoring data, wherein the ranking score of the requesting device and/or the ranking score of a remaining device is calculated using at least one of:
    an event parameter describing events in a content of the monitoring data, and
    a complexity parameter describing the complexity of the content of the monitoring data.

10. The method according to claim 1, wherein each of the plurality of devices has a lower bandwidth limit, and wherein bandwidth cannot be received from a device when this would result in that the upper bandwidth limit of the device being lower than the lower bandwidth limit.

11. The method according to claim 1, wherein when a new device is added to the system comprising the plurality of devices, the upper bandwidth limit of the new device is zero.

12. A non-transitory computer-readable medium storing instructions that, when executed by a processor, cause the processor to negotiate bandwidth in a system comprising a plurality of devices interconnected in a peer-to-peer network, each of the plurality of devices having an adaptable upper bandwidth limit, by:

calculating, at a requesting device among the plurality of devices, a ranking score of the requesting device indicating a level of priority of increasing the upper bandwidth limit of the requesting device, sending, from the requesting device, a request for additional bandwidth to one or more remaining, peer devices of the plurality of devices, wherein none of the peer devices comprise a server for distributing bandwidth in a centralized manner, receiving, at the requesting device, one or more answers from the one or more remaining devices, wherein each of the one or more answers corresponds to a respective one of the one or more remaining devices and comprises:

a ranking score of the remaining device describing a level of priority of keeping the upper bandwidth limit of the remaining device, determining, at the requesting device, a device, among the one or more remaining devices to which the one or more received answers corresponds, to receive bandwidth from based on:

the ranking score of the requesting device, and the ranking score of the one or more answers, increasing the upper bandwidth limit of the requesting device, and instructing, by the requesting device, the determined device to decrease the upper bandwidth limit of the determined device to receive bandwidth from.

13. The non-transitory computer-readable medium of claim 12, wherein the request for additional bandwidth is a broadcast message in the peer-to-peer network.

14. The non-transitory computer-readable medium of claim 12, wherein the request for additional bandwidth comprises an identifier of the requesting device, and wherein each of the one or more answers is a unicast message in the peer-to-peer network.

15. The non-transitory computer-readable medium of claim 12, wherein the step of increasing the upper bandwidth limit of the requesting device comprises increasing the upper bandwidth limit by a predetermined amount, and wherein the step of decreasing the upper bandwidth limit of the determined device comprises decreasing the upper bandwidth limit by the predetermined amount.

16. The non-transitory computer-readable medium of claim 12, further comprising:

calculating a difference between the ranking score of the requesting device and the ranking score of the answer corresponding to the determined device to receive bandwidth from, and based on the calculated difference, calculating an amount of bandwidth to be received by the requesting device from the determined device, wherein the step of increasing the upper bandwidth limit of the requesting device comprises increasing the upper bandwidth limit by the calculated amount of bandwidth, and wherein the step of decreasing the upper bandwidth limit of the determined device comprises decreasing the upper bandwidth limit by the calculated amount of bandwidth.

17. A requesting device interconnected with one or more other devices in a peer-to-peer network, the device having an adaptable upper bandwidth limit, the device being adapted to:

calculate a ranking score indicating a level of priority of increasing the upper bandwidth limit, send a request for additional bandwidth to the one or more other, peer devices, wherein none of the peer devices comprises a server for distributing bandwidth in a centralized manner, receive one or more answers from the one or more other devices, wherein each of the one or more answers corresponds to a respective one of the one or more other devices and comprises:

a ranking score of the other device describing a level of priority of keeping the upper bandwidth limit of the other device, determine a device, among the one or more other devices to which the one or more received answers corresponds, to receive bandwidth from based on:

the ranking score, and the ranking score of the one or more answers, increase the upper bandwidth limit, and send a message to the determined device instructing the determined device to decrease the upper bandwidth limit of the determined device.

18. A device according to claim 17, being a monitoring device acquiring monitoring data.

* * * * *